(12) United States Patent
Cadima

(10) Patent No.: US 9,488,283 B2
(45) Date of Patent: Nov. 8, 2016

(54) CONTROL VALVE FOR A GAS BURNER

(71) Applicant: General Electric Company, Schenectady, NY (US)

(72) Inventor: Paul Bryan Cadima, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 63 days.

(21) Appl. No.: 14/598,263

(22) Filed: Jan. 16, 2015

(65) Prior Publication Data

US 2016/0208933 A1 Jul. 21, 2016

(51) Int. Cl.
| F16K 5/04 | (2006.01) |
| F24C 3/12 | (2006.01) |
| B23P 15/00 | (2006.01) |
| F16K 5/10 | (2006.01) |

(52) U.S. Cl.
CPC ............ *F16K 5/0407* (2013.01); *B23P 15/001* (2013.01); *F16K 5/103* (2013.01); *F24C 3/12* (2013.01)

(58) Field of Classification Search
CPC .............. F16K 1/54; F16K 5/12; F16K 3/34; F16K 5/18; F16K 5/103; F16K 5/0214; F16K 5/0414
USPC .......................... 251/207, 208, 209, 309, 310
See application file for complete search history.

(56) References Cited

U.S. PATENT DOCUMENTS

| 545,769 | A | * | 9/1895 | Bowman | F16K 5/12 137/625 |
| 5,009,393 | A | * | 4/1991 | Massey | F16K 5/0214 137/625.3 |
| 5,027,854 | A | * | 7/1991 | Genbauffe | F16K 5/0207 137/599.17 |
| 7,156,370 | B2 | * | 1/2007 | Albizuri | F16K 5/0214 126/39 E |
| 7,312,269 | B2 | | 12/2007 | Cevolini | |
| 7,967,005 | B2 | * | 6/2011 | Parrish | A47J 37/0713 126/39 N |
| 8,196,897 | B2 | * | 6/2012 | Albizuri Landa | F16K 5/0214 126/52 |
| 8,240,333 | B2 | * | 8/2012 | Yontz | E03B 7/077 137/218 |
| 8,592,519 | B2 | | 11/2013 | Martinoni | |
| 8,955,558 | B2 | * | 2/2015 | Bosveld | B29C 67/0085 141/18 |
| 9,200,807 | B2 | * | 12/2015 | Albizuri | F23N 1/007 |
| 2012/0232857 | A1 | | 9/2012 | Fisker et al. | |
| 2013/0334446 | A1 | * | 12/2013 | Gur | F16K 5/0414 251/122 |

* cited by examiner

Primary Examiner — Matthew W Jellett
(74) Attorney, Agent, or Firm — Dority & Manning, P.A.

(57) ABSTRACT

A control valve for a gas burner includes a valve body that defines an inlet conduit. The inlet conduit has a non-circular shape. A plug is positioned within a valve chamber of the valve body. The plug defines a slot on an outer surface of the plug, and the plug also defines a flow chamber within the plug. The plug further defines an aperture that extends between the slot of the plug and the flow chamber of the plug.

14 Claims, 3 Drawing Sheets

CONTROL VALVE FOR A GAS BURNER

FIELD OF THE INVENTION

The present subject matter relates generally to control valves for gas burners.

BACKGROUND OF THE INVENTION

Gas cooktops generally include a plurality of gas burners for heating cooking utensils and food items within the cooking utensils. Certain gas cooktops include manual control valves that allow a user of the gas cooktops to adjust or regulate operation of the gas burners. For example, turning a knob of the manual control valve in a first direction increases gas fuel flow to the gas burner and thereby increases a heat output of the associated gas burner. Conversely, turning the knob of the manual control valve in a second, opposite direction decreases gas fuel flow to the gas burner and thereby decreases a heat output of the associated gas burner.

Certain manual control valves adjust gas fuel flow to the associated gas burner by rotating an inner plug within a valve body. Rotation of the inner plug within the valve body adjusts an overlap of respective apertures of the inner plug and valve body. Changing the overlap of the respective apertures of the inner plug and valve body adjusts resistance to gas fuel flow through the manual control valve.

To accurately and precisely regulate gas fuel flow through the manual control valve, the inner plug and valve body can have complex shapes and require tight tolerances. Thus, precision machining may be required to manufacture the inner plug and valve body. Such precision machining techniques generally limit apertures of the inner plug and valve body to circular cross-sections due to manufacturing limitations associated with such machining. However, circular apertures may require large rotations of the inner plug within the valve body to reach a peak flow rate and to begin decreasing the gas flow rate. Thus, circular apertures may limit a resolution of the manual control valve.

Accordingly, a control valve for a gas burner with features for providing a more linear change in a gas flow rate through the control valve in response to rotation of a plug of the control valve within a valve body of the control valve relative to traditional circular apertures would be useful.

BRIEF DESCRIPTION OF THE INVENTION

The present subject matter provides a control valve for a gas burner. The control valve includes a valve body that defines an inlet conduit. The inlet conduit has a non-circular shape. A plug is positioned within a valve chamber of the valve body. The plug defines a slot on an outer surface of the plug, and the plug also defines a flow chamber within the plug. The plug further defines an aperture that extends between the slot of the plug and the flow chamber of the plug. Additional aspects and advantages of the invention will be set forth in part in the following description, or may be apparent from the description, or may be learned through practice of the invention.

In a first exemplary embodiment, a control valve for a gas burner is provided. The control valve defines a transverse direction. The control valve includes a valve body that defines an inlet conduit and a valve chamber. The inlet conduit has a non-circular shape in a plane that is perpendicular to the transverse direction. A plug is positioned within the valve chamber of the valve body. The plug defines a slot on an outer surface of the plug. The plug also defines a flow chamber within the plug. The plug further defines an aperture that extends between the slot of the plug and the flow chamber of the plug. The plug is configured to rotate within the valve chamber of the valve body in order adjust a position of the slot of the plug relative to the inlet conduit of the valve body.

In a second exemplary embodiment, a method for forming a valve body and a plug of a control valve for a gas burner is provided. The method includes establishing three-dimensional information of the valve body and the plug of the control valve and converting the three-dimensional information of the valve body and the plug of the control valve from the step of establishing into a plurality of slices. Each slice of the plurality of slices defines a respective cross-sectional layer of the valve body and the plug of the control valve. The method also includes successively forming each cross-sectional layer of the valve body and the plug of the control valve with an additive process. After the step of successively forming: (1) the valve body of the control valve defines an inlet conduit and a valve chamber; (2) the inlet conduit has a non-circular shape; (3) the plug is positioned within the valve chamber of the valve body; (4) the plug defines a slot on an outer surface of the plug; (5) the plug also defines a flow chamber within the plug; and (6) the plug further defines an aperture that extends between the slot of the plug and the flow chamber of the plug.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
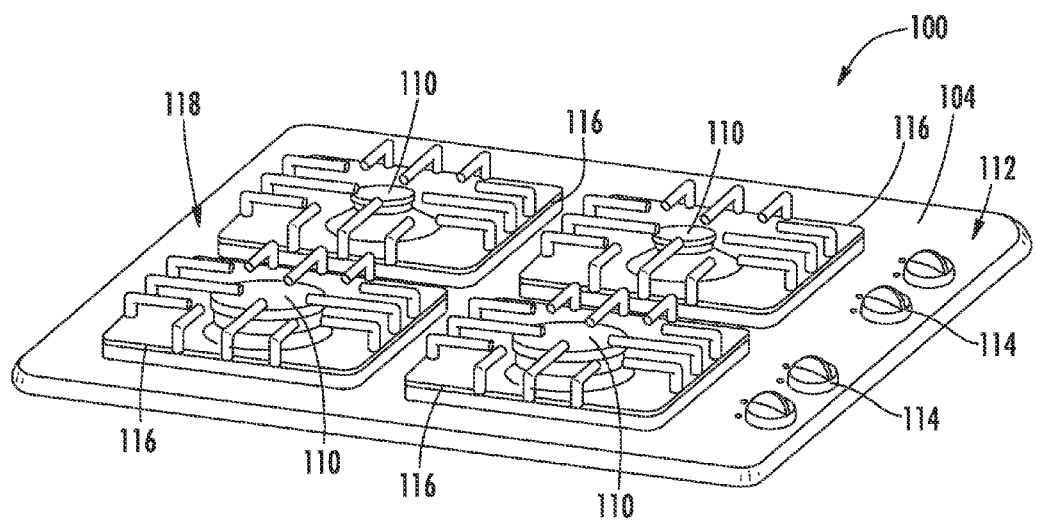
FIG. 1 provides a perspective view of a cooktop appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a cooktop appliance 100 as may be employed with the present subject matter. Cooktop appliance 100 includes a material that provides a top panel 104. By way of example, the material may include stainless steel, glass, ceramics, enameled steel, and combinations thereof.

For cooktop appliance 100, a utensil holding food and/or cooking liquids (e.g., oil, water, etc.) is placed onto grates 116 at a location of any of burner assemblies 110. As shown in FIG. 1, burners assemblies 110 can be configured in various sizes so as to provide e.g., for the receipt of cooking utensils (i.e., pots, pans, etc.) of various sizes and configurations and to provide different heat inputs for such cooking utensils. Grates 116 are supported on a top 118 of top panel 104. Burner assemblies 110 provide thermal energy to cooking utensils on grates 116. In particular, burner assemblies 110 extend through top panel 104 below grates 116. Burner assemblies 110 may be mounted to top panel 104.

A user interface panel 112 is located within convenient reach of a user of the cooktop appliance 100. For this exemplary embodiment, panel 112 includes knobs 114 that are each associated with one of burner assemblies 110 or a control valve associated with each of the burner assemblies 110. Knobs 114 allow the user to activate each burner assembly and determine the amount of heat input provided by each burner assembly 110 to a cooking utensil located thereon. Panel 112 may also be provided with one or more graphical display devices that deliver certain information to the user such as e.g., whether a particular heating source is activated and/or the level at which the element is set.

Although shown with knobs 114, it should be understood that controls 114 and the configuration of cooktop appliance 100 shown in FIG. 1 is provided by way of example only. More specifically, user interface 112 may include various input components, such as one or more of a variety of touch-type controls, electrical, mechanical or electro-mechanical input devices including rotary dials, push buttons, and touch pads. The user interface 112 may include other display components, such as a digital or analog display device designed to provide operational feedback to a user.

Cooktop appliance 100 shown in FIG. 1 illustrates an exemplary embodiment of the present subject matter. Thus, although described in the context of cooktop appliance 100, the present subject matter may be used in cooktop appliances having other configurations, e.g., a cooktop appliance with one, two, or more additional burner assemblies. Similarly, the present subject matter may be used in other appliances, e.g., range appliances having cooktop burners, outdoor grills, etc.

Figure 2:
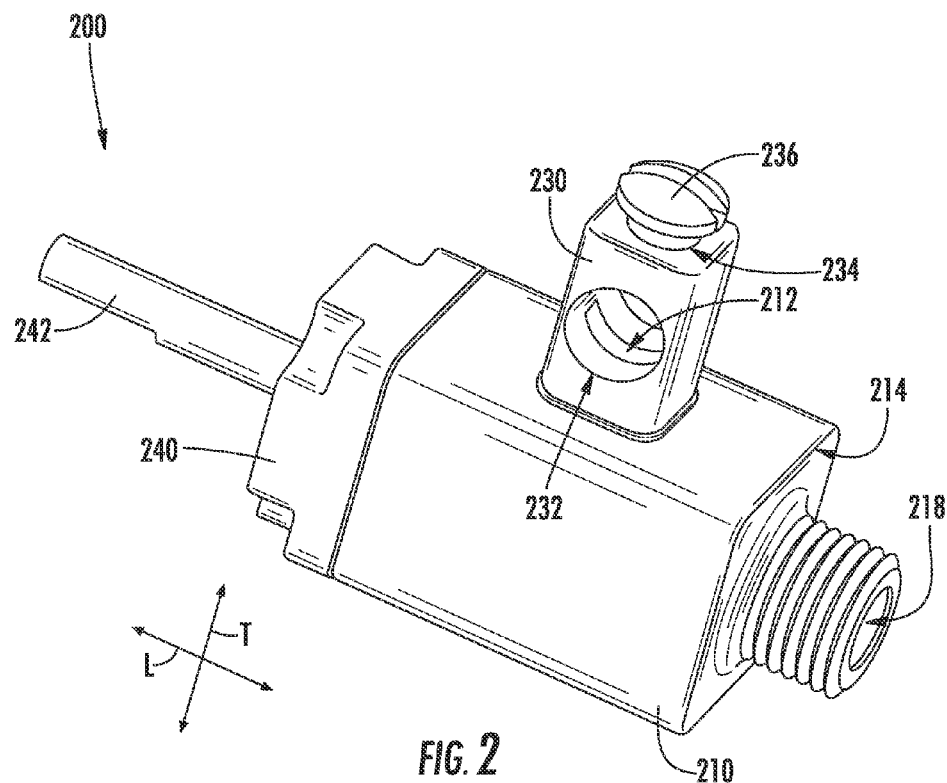
FIG. 2 provides a perspective view of a control valve according to an exemplary embodiment of the present subject matter.
Figure 3:
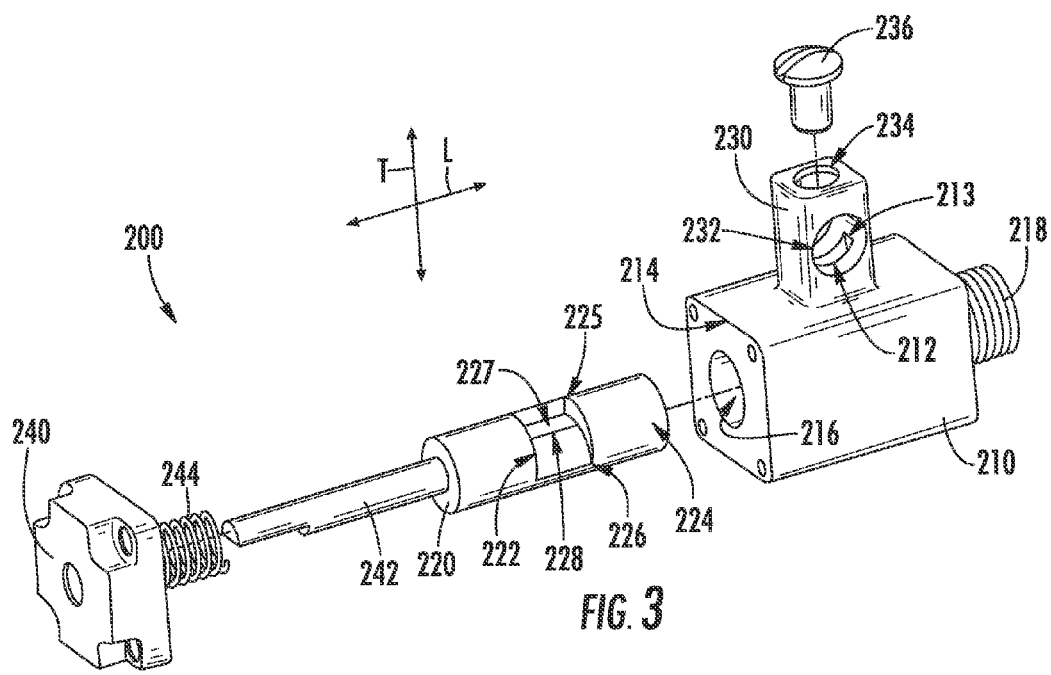
FIG. 3 provides an exploded view of the exemplary control valve of FIG. 2.
Figure 4:
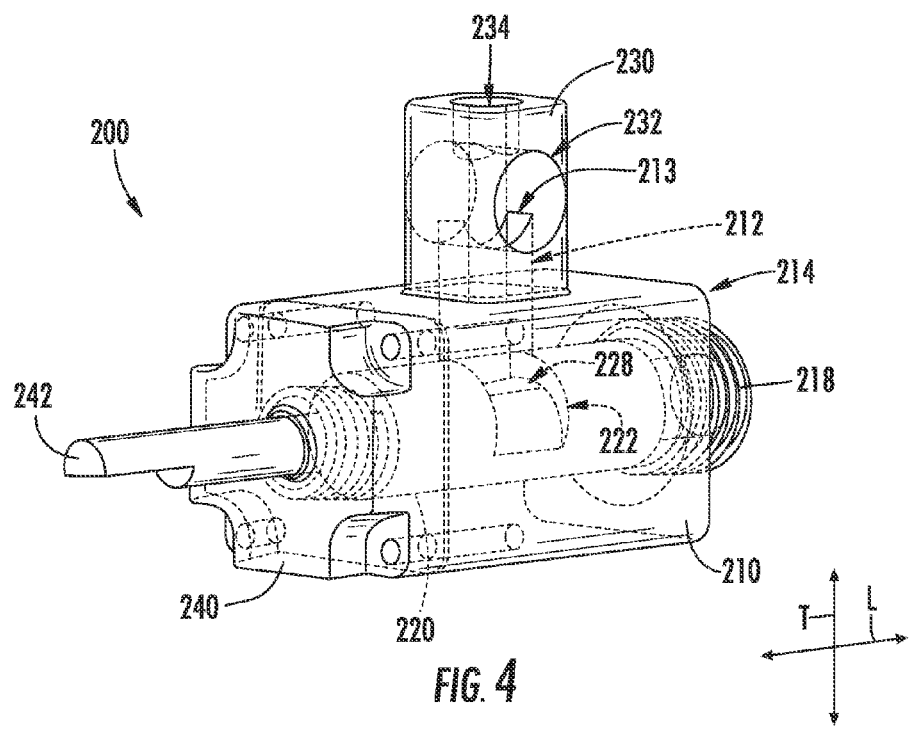
FIG. 4 provides a perspective view of the exemplary control valve of FIG. 2 with certain internal features of the exemplary control valve shown with dashed lines.

FIG. 2 provides a perspective view of a control valve 200 according to an exemplary embodiment of the present subject matter. FIG. 3 provides an exploded view of control valve 200. FIG. 4 provides a perspective view of control valve 200 with certain internal features of control valve 200 shown with dashed lines. Control valve 200 may be used with any suitable gas burner. For example, control valve 200 may be used in cooktop appliance 100 (FIG. 1) to regulate gas fuel flow to one of burner assemblies 106, 108, 109, and 110.

As may be seen in FIGS. 2, 3 and 4, control valve 200 defines a transverse direction T and a lateral direction L. The transverse direction T and the lateral direction L are perpendicular to each other. Control valve 200 includes a valve body 210 and a plug 220. Valve body 210 defines an inlet conduit 212 and a valve chamber 216. Inlet conduit 212 is configured for receiving a flow of gaseous fuel and directing the flow of gaseous fuel into valve chamber 216 of valve body 210. From valve chamber 216 of valve body 210, the flow of gaseous fuel exits valve body 210 at an outlet conduit 218 of valve body 210. Outlet conduit 218 may be treaded in order to engage a fuel line coupling of a gas burner, as shown in FIGS. 2 and 3. A flow rate of gaseous fuel through valve chamber 216 of valve body 210 is regulated with plug 220, as discussed in greater detail below.

Inlet conduit 212 may have any suitable shape. For example, inlet conduit 212 may have a noncircular shape in a plane that is perpendicular to the transverse direction T. In particular, inlet conduit 212 may have a rectangular shape in a plane that is perpendicular to the transverse direction T, as shown in FIG. 2. In alternative exemplary embodiments, inlet conduit 212 may have an oval or elliptical shape, e.g., with a major axis of the elliptical shape being at least twice as long as a minor axis of the elliptical shape. A cross-sectional area of inlet conduit 212 may also be uniform or constant along the transverse direction T.

A mounting bracket 230 is mounted to valve body 210, e.g., at an entrance 213 of inlet conduit 212 on top portion 214 of valve body 210. Mounting bracket 230 may be integrally formed with valve body 210 such that mounting bracket 230 and valve body 210 are formed of a single continuous piece of material, such as a metal or plastic. Mounting bracket 230 is configured for receiving and coupling to a gaseous fuel manifold, such as steel tubing. In particular, mounting bracket 230 defines a manifold opening 232. Manifold opening 232 is sized and positioned for receiving the gaseous fuel manifold. To assist with securing the gaseous fuel manifold to mounting bracket 230, mounting bracket 230 defines a, e.g., round, fastener hole 234. A fastener 236 may extend into fastener hole 234 to or into the gaseous fuel manifold. Thus, fastener 236 may engage mounting bracket 230 and the gaseous fuel manifold in order to secure the gaseous fuel manifold to mounting bracket 230 within the manifold opening 232 of mounting bracket 230. Manifold opening 232 may be positioned between fastener hole 234 and entrance 213 of inlet conduit 212, e.g., along the transverse direction T. Thus, mounting bracket 230 may be positioned over entrance 213 of inlet conduit 212, e.g., along the transverse direction T.

Plug 220 is positioned within valve chamber 216 of valve body 210. Plug 220 assists with regulating gaseous fuel flow through valve chamber 216 of valve body 210. In particular, a cross-sectional area of plug 220 in a plane that is perpendicular to the lateral direction L may correspond to or match (e.g., be slightly less than) a cross-sectional area of valve chamber 216 in the plane that is perpendicular to the lateral direction L. Thus, gas fuel flowing into valve chamber 216 of valve body 210 may flow through plug 220 to outlet conduit 218 of valve body 210 rather than around plug 222 within valve chamber 216 of valve body 210.

Plug 220 defines a slot 222 on an outer surface 224 of plug 220. For example, slot 222 may extend, e.g., circumferentially, between a first end portion 225 and a second end portion 226 on outer surface 224 of plug 220. A height or depth of slot 222 may vary or change between first and second end portions 225, 226 of slot 222. In particular, the height of slot 222 may decrease, e.g., linearly or continuously, from first end portion 225 of slot 222 to second end portion 226 of slot 222.

Plug 220 also defines a flow chamber 227 within plug 220. Flow chamber 227 of plug 220 extends to outlet conduit 218 of valve body 210. Plug 220 further defines an aperture 228. Aperture 228 of plug 220 extends between slot 222 of plug 220 and flow chamber 227 of plug 220. Thus, aperture 228 of plug 220 places slot 222 of plug 220 in fluid communication with flow chamber 227 of plug 220 and permits gaseous fuel flow from slot 222 of plug 220 to flow chamber 227 of plug 220. Aperture 228 may be positioned at or adjacent first end portion 225 of slot 222.

Aperture 228 of plug 220 may have any suitable shape. For example, aperture 228 of plug 220 may have a noncircular shape. In particular, aperture 228 of plug 220 may have a rectangular shape, as shown in FIG. 3. Thus, the shape of aperture 228 may correspond to or match the shape of inlet conduit 212 of valve body 210, in certain exemplary embodiments. In particular, widths of inlet conduit 212 of valve body 210, aperture 228 of plug 220 and slot 222 of plug 220 along the lateral direction L may be about (e.g., with five percent) equal to one another.

Plug 220 is configured to rotate within valve chamber 216 of valve body 210. Rotation of plug 220 within valve chamber 216 adjusts a position of slot 222 of plug 220 relative to inlet conduit 212 of valve body 210. In such a manner, the flow of gaseous fuel through control valve 200 is regulated or controlled. In particular, more gaseous fuel may flow through control valve 200 when aperture 228 of plug 220 is aligned with inlet conduit 212 of valve body 210. Conversely, less gaseous fuel may flow through control valve 200 when aperture 228 of plug 220 is not aligned with inlet conduit 212 of valve body 210, e.g., such as when other portions of slot 222 are aligned with inlet conduit 212 of valve body 210.

Control valve 200 also includes a cap 240 mounted to valve body 210. Cap 240 assists with sealing valve chamber 216 of valve body 210 and holding plug 220 within valve chamber 216 of valve body 210. A control arm 242 of plug 220 may extend through cap 240, e.g., along the lateral direction L. Control arm 242 may be coupled to a knob, and a user of control valve 200 may rotate control arm 242 in order to rotate plug 220 within valve chamber 216 of valve body 210 and regulate fuel flow through control valve 200, as discussed above. A biasing mechanism 244, such as a coil spring, may urge plug 220 towards outlet conduit 218 and away from cap 242. Thus, cap 242 and outlet conduit 218 may be positioned at opposite sides of valve body 210, e.g., along the lateral direction L.

Figure 5:
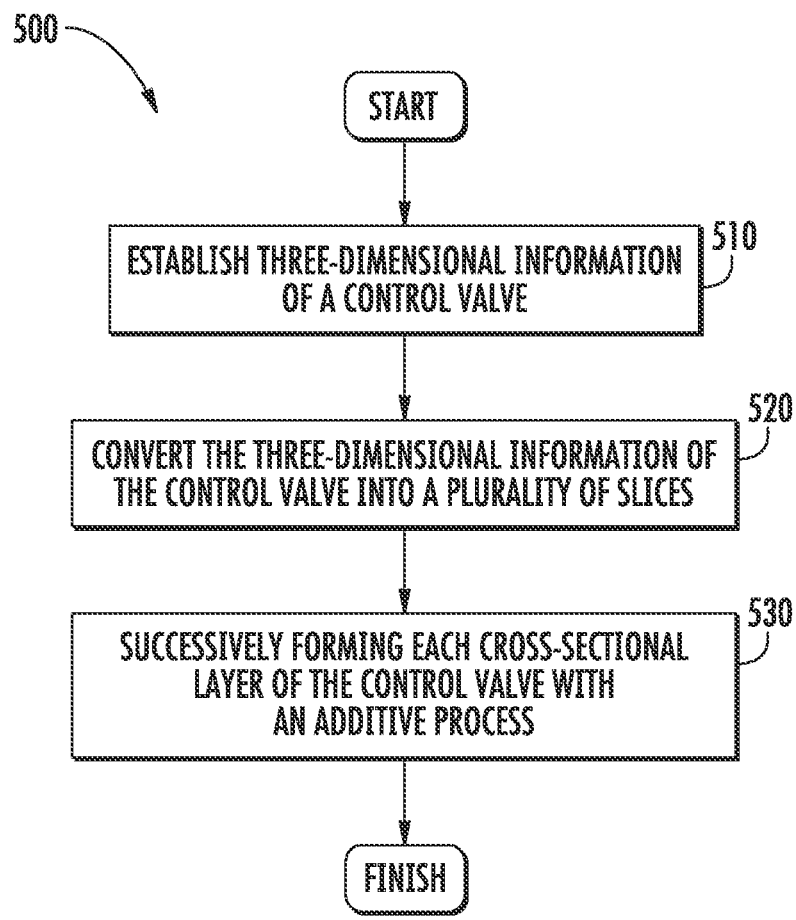
FIG. 5 illustrates a method for forming a control valve for a gas burner according to an exemplary embodiment of the present subject matter.

FIG. 5 illustrates a method 500 for forming a control valve for a gas burner according to an exemplary embodiment of the present subject matter. Method 500 may be used to form any suitable control valve. For example, method 500 may be used to form control valve 200 (FIG. 2). In particular, method 500 may be used to form valve body 210 and plug 220 of control valve 200. Thus, method 500 is discussed in greater detail below in the context of control valve 200. Method 500 permits formation of various features of control valve 200, as discussed in greater detail below.

Method 500 includes fabricating components of control valve 200 as unitary components. For example, each of valve body 210 and plug 220 of control valve 200 may be formed of a single continuous piece of plastic, metal or other suitable material utilizing method 500. Method 500 includes manufacturing or forming at least a portion of control valve 200 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 510, three-dimensional information of control valve 200 is determined. As an example, a model or prototype of control valve 200 may be scanned to determine the three-dimensional information of control valve 200 at step 510. As another example, a model of control valve 200 may be constructed using a suitable CAD program to determine the three-dimensional information of control valve 200 at step 510. At step 520, the three-dimensional information is converted into a plurality of slices that each defines a cross-sectional layer of control valve 200. As an example, the three-dimensional information from step 510 may be divided into equal sections or segments, e.g., along a central axis of control valve 200 or any other suitable axis. Thus, the three-dimensional information from step 510 may be discretized at step 520, e.g., in order to provide planar cross-sectional layers of control valve 200.

After step 520, control valve 200 is fabricated using the additive process, or more specifically each layer is successively formed at step 530, e.g., by fusing or polymerizing a plastic using laser energy or heat. The layers may have any suitable size. For example, each layer may have a size between about five ten-thousandths of an inch and about two thousandths of an inch. Control valve 200 may be fabricated using any suitable additive manufacturing machine as step 530. For example, any suitable laser sintering machine, inkjet printer or laserjet printer may be used at step 530. Valve body 210 and plug 220 may be formed separately at step 520 and assembled together after step 520 to form control valve 200.

Utilizing method 500, control valve 200 may have fewer components and/or joints than known control valves. Thus, control valve 200 may require fewer components because various components of control valve 200 may be formed of a single piece of continuous plastic or metal, e.g., rather than multiple pieces of plastic or metal joined or connected together. Further, method 500 may assist with forming inlet conduit 212 of valve body 210 and/or aperture 228 of plug 220 with a non-circular shape while also permitting placement of mounting bracket 230 over inlet conduit 212 on valve body 210. Also, control valve 200 may be less prone to leaks and/or be stronger when formed with method 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control valve for a gas burner, the control valve defining a transverse direction and a lateral direction perpendicular to the transverse direction, the control valve comprising:

a valve body defining an inlet conduit and a valve chamber, the inlet conduit having a width along the lateral direction and a non-circular shape in a plane that is perpendicular to the transverse direction; and a plug positioned within the valve chamber of the valve body, the plug defining a slot on an outer surface of the plug, the slot including a width along the lateral direction, the plug also defining a flow chamber within the plug, the plug further defining an aperture that has a non-circular shape, includes a width along the lateral direction, and extends perpendicular to the lateral direction between the slot of the plug and the flow chamber of the plug, the plug configured to rotate about the lateral direction within the valve chamber of the valve body in order adjust a position of the slot of the plug relative to the inlet conduit of the valve body, wherein the slot extends between a first end portion and a second end portion on the outer surface of the plug, a height of the slot decreasing from the first end portion of the slot to the second end portion of the slot, wherein the width of the inlet conduit, the width of the slot, and the width of the aperture are about equal, and wherein a cross-sectional area of the inlet conduit is constant along the transverse direction.

2. The control valve of claim 1, wherein the aperture is positioned at the first end portion of the slot.

3. The control valve of claim 1, further comprising a mounting bracket mounted to the valve body at an entrance of the inlet conduit.

4. The control valve of claim 3, wherein the mounting bracket defines a fastener hole above the entrance of the inlet conduit, the mounting bracket also defining a manifold opening sized and positioned for receiving a manifold of a gas supply, the manifold opening positioned between the fastener hole and the entrance of the inlet conduit along the transverse direction.

5. The control valve of claim 3, wherein the mounting bracket is integrally formed with the valve body.

6. The control valve of claim 1, wherein the inlet conduit has a rectangular shape in a plane that is perpendicular to the transverse direction.

7. The control valve of claim 6, wherein the aperture of the plug has a rectangular shape.

8. A method for forming a valve body and a plug of a control valve for a gas burner, comprising:
establishing three-dimensional information of the valve body and the plug of the control valve, including information defining a transverse direction and a lateral direction perpendicular to the transverse direction;

converting the three-dimensional information of the valve body and the plug of the control valve from said step of establishing three dimensional information of the valve body and the plug of the control valve into a plurality of individual three dimensional cross sectional layer slices of portions of the valve body and the plug, each slice of the plurality of slices defining a respective cross-sectional layer of the valve body and the plug of the control valve; and successively forming each cross-sectional layer of the valve body and the plug of the control valve with an additive process;

wherein, after said step of successively forming: (1) the valve body of the control valve defines an inlet conduit and a valve chamber, the inlet conduit including a width along the lateral direction; (2) the inlet conduit has a non-circular shape in a plane that is perpendicular to the transverse direction; (3) the plug is positioned within the valve chamber of the valve body; (4) the plug defines a slot on an outer surface of the plug, the slot including a width along the lateral direction; (5) the plug also defines a flow chamber within the plug; and (6) the plug further defines an aperture that has a non-circular shape, includes a width along the lateral direction, and extends between the slot of the plug and the flow chamber of the plug, wherein the slot extends between a first end portion and a second end portion on the outer surface of the plug, a height of the slot decreasing from the first end portion of the slot to the second end portion of the slot, wherein the width of the inlet conduit, the width of the slot, and the width of the aperture are about equal and wherein the a cross-sectional area of the inlet conduit is constant along the transverse direction.

9. The method of claim 8, wherein the additive process comprises at least one of fused deposition modeling, selective laser sintering and direct metal laser sintering.

10. The method of claim 8, wherein the aperture is positioned at the first end portion of the slot after said step of successively forming.

11. The method of claim 8, wherein a mounting bracket is mounted to the valve body at an entrance of the inlet conduit after said step of successively forming.

12. The method of claim 11, wherein, after said step of successively forming: (1) the mounting bracket defines a fastener hole above the entrance of the inlet conduit; (2) the mounting bracket also defines a manifold opening sized and positioned for receiving a manifold of a gas supply; and (3) the manifold opening is positioned between the fastener hole and the entrance of the inlet conduit along the transverse direction.

13. The method of claim 12, wherein the mounting bracket and the valve body comprises a single continuous piece of material after said step of successively forming.

14. The method of claim 8, wherein the inlet conduit and the aperture of the plug have common cross-sectional shapes after said step of successively forming.

* * * * *

UNITED STATES PATENT AND TRADEMARK OFFICE
CERTIFICATE OF CORRECTION

PATENT NO. : 9,488,283 B2  
APPLICATION NO. : 14/598263  
DATED : November 8, 2016  
INVENTOR(S) : Paul Bryan Cadima Page 1 of 1

It is certified that error appears in the above-identified patent and that said Letters Patent is hereby corrected as shown below:

In the Claims

In Line 27 of Column 8, "equal and" should be "equal, and"

Signed and Sealed this
Fifteenth Day of May, 2018

Andrei Iancu
*Director of the United States Patent and Trademark Office*